(12) United States Patent
Fair et al.

(10) Patent No.: US 10,929,247 B2
(45) Date of Patent: Feb. 23, 2021

(54) AUTOMATIC CREATION OF APPLICATION-CENTRIC EXTENDED METADATA FOR A STORAGE APPLIANCE

(71) Applicant: EMC IP Holding Company LLC, Hopkinton, MA (US)

(72) Inventors: Robert Fair, Cary, NC (US); Donna Barry Lewis, Holly Springs, NC (US); Robert Fulk, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 366 days.

(21) Appl. No.: 15/963,921

(22) Filed: Apr. 26, 2018

(65) Prior Publication Data

US 2019/0332495 A1 Oct. 31, 2019

(51) Int. Cl.
*G06F 11/14* (2006.01)
*H04L 29/08* (2006.01)
*G06F 16/16* (2019.01)
*G06F 16/17* (2019.01)
*G06F 16/174* (2019.01)

(52) U.S. Cl.
CPC ...... *G06F 11/1464* (2013.01); *G06F 11/1453* (2013.01); *G06F 11/1469* (2013.01); *G06F 16/164* (2019.01); *G06F 16/1734* (2019.01); *G06F 16/1748* (2019.01); *H04L 67/1097* (2013.01)

(58) Field of Classification Search
CPC .............. G06F 11/1464; G06F 16/164; G06F 16/1748; G06F 16/1734; G06F 11/1453; G06F 11/1469; H04L 67/1097
USPC ........................................................ 707/640
See application file for complete search history.

(56) References Cited

U.S. PATENT DOCUMENTS

| | | | | |
|---|---|---|---|---|
| 9,830,228 | B1* | 11/2017 | Chopra | G06F 11/1464 |
| 2010/0332401 | A1* | 12/2010 | Prahlad | H04L 67/1095 |
| | | | | 705/80 |
| 2014/0188812 | A1* | 7/2014 | Vijayan | G06F 11/1469 |
| | | | | 707/679 |
| 2015/0212897 | A1* | 7/2015 | Kottomtharayil | G06F 11/00 |
| | | | | 714/20 |
| 2016/0188181 | A1* | 6/2016 | Smith | G06F 3/016 |
| | | | | 715/765 |
| 2016/0283274 | A1* | 9/2016 | Kochunni | G06F 9/5022 |
| 2017/0262350 | A1* | 9/2017 | Dornemann | G06F 16/172 |

* cited by examiner

*Primary Examiner* — Dung K Chau
(74) *Attorney, Agent, or Firm* — Staniford Tomita LLP

(57) ABSTRACT

Embodiments are directed to a system and method of providing consistent metadata to storage appliance objects in a network, by: obtaining environmental information that is available to deduplication backup program accessing the storage appliance objects, the environmental information comprising application name, client name, and client IP address; identifying file systems objects created by the deduplication backup program; and using a client-side generic network mount for the deduplication backup system to automatically create extended metadata for each of the identified DDR filesystem objects created through the deduplication backup program.

20 Claims, 9 Drawing Sheets

AUTOMATIC CREATION OF APPLICATION-CENTRIC EXTENDED METADATA FOR A STORAGE APPLIANCE

TECHNICAL FIELD

Embodiments are generally directed to networked-based data backup methods, and more specifically to generating and processing application-centric metadata for storage devices.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage.

Large-scale data backup systems may include a variety of different backup devices, referred to as "storage appliances" that provide data to, or manage data for other networked computing devices such as network-attached storage (NAS) or storage area network (SAN) devices. A cloud storage appliance is a stand-alone computing device or virtual machine (VM) image used to move data from a local site to a remote service provider. Such appliances are used for primary data, as well as backup and archive data. An appliance can be a proprietary vendor server with pre-installed software or a virtual appliance that can be installed on ordinary commodity hardware.

In backup applications, system metadata that includes information such as client schedules, storage configurations, system settings, and so on, is automatically backed up as part of a replication or archiving job. In the event of an appliance failure, this metadata is used to restore the appliance through a disaster recovery (DR) process. Extended metadata, which includes information such as filesystem files, storage units, and so on, may be associated with storage appliance objects and subsequently used by management applications to perform analysis and other tasks. Extended metadata may be set by applications that are metadata-aware, however not all applications are metadata-aware. Furthermore, the application-aware setting of extended metadata requires per-application changes that may be inconsistent.

It is thus desirable to provide consistent core metadata across all use-cases, and to provide a method and system that makes use of the client deployment/runtime environment to consistently detect and set extended metadata on storage appliance objects.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost (DDBoost) are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
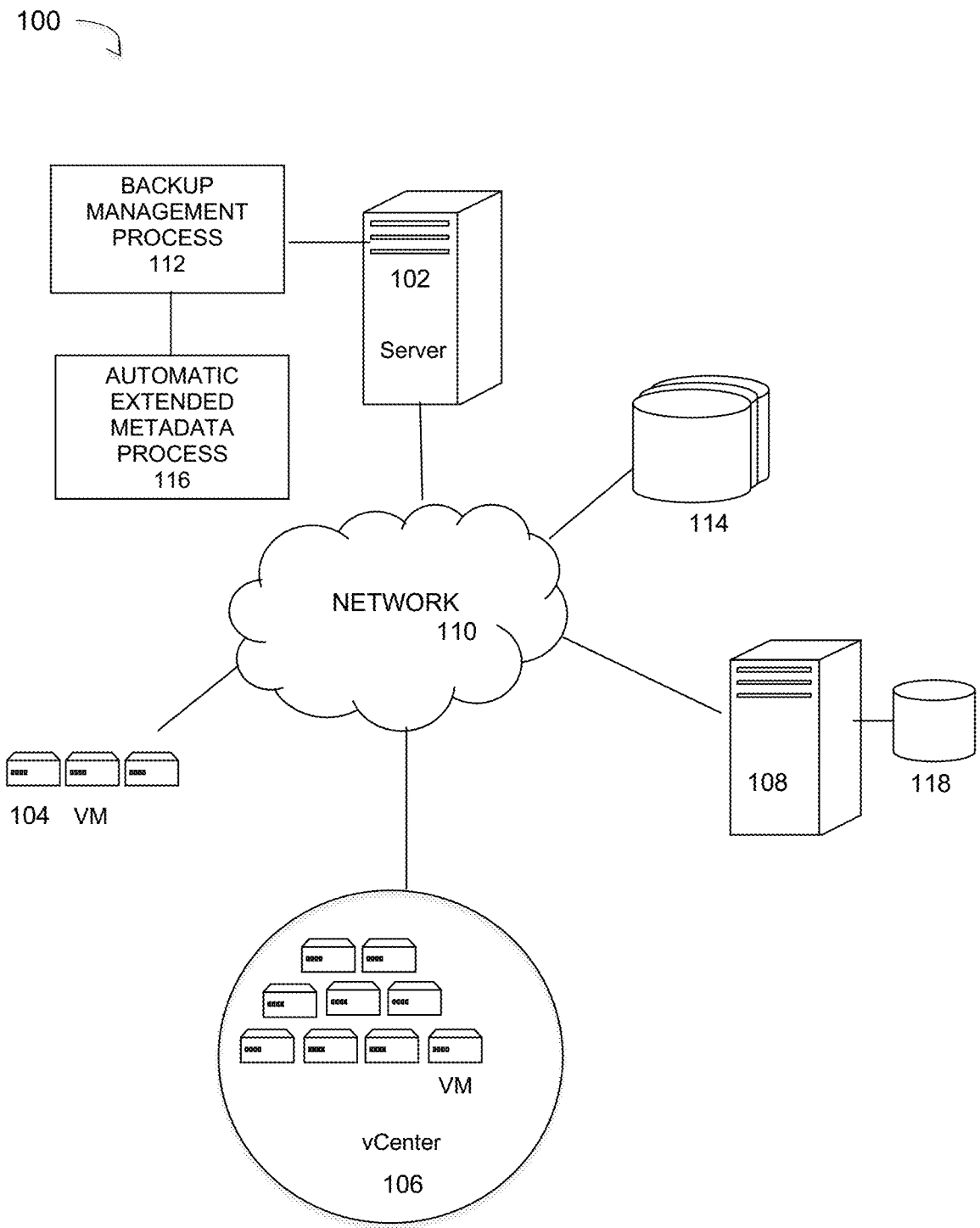
FIG. 1 is a diagram of a large-scale network implementing a system for automatic creation of application-centric extended metadata for a storage appliance, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a large-scale network implementing a system for automatic creation of application-centric extended metadata for a storage appliance, under some embodiments. System 100 represents a large-scale backup system that includes several different backup appliances (data sources and storage devices) including actual and virtualized computing resources.

In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server application.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

Though FIG. 1 illustrates a system that is based largely on VM backup devices, embodiments are not so limited, and any virtual or non-virtual backup device or storage media may be used. For the embodiment of FIG. 1, network system 100 includes a server 102 that executes a data backup process with a process or processing component 116 that automatically creates application-centric metadata for a storage appliance.

In an embodiment, system 100 may represent a Data Domain™ Restorer (DDR)-based deduplication storage system, and storage server 102 may be implemented as a Data Domain deduplication storage server provided by Dell/EMC™ Corporation for use with DDR storage devices. However, other similar backup and storage systems are also possible. System 100 may utilize certain protocol-specific namespaces that are the external interface to applications and include NFS (network file system) and CIFS (common internet file system) namespaces, as well as DD Boost provided by Dell/EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system.

Embodiments utilize the DD Boost File System Plug-In (BoostFS), which resides on the application system and presents a standard file system mount point to the application. With direct access to a BoostFS mount point, the application can leverage the storage and network efficiencies of the DD Boost protocol for backup and recovery. As a file server system implementation, the BoostFS workflow is similar to NFS but also leverages the DD Boost protocol.

In a storage system generally, metadata is a set of values that define a file's attributes and is typically defined by the operating system. Extended metadata allows users and applications to add to the metadata, usually in a key/value format. With respect to data retrieval, extended metadata provides a mechanism for keyword definition, including a primary filing location. As an example, an extended metadata keyword could be created to contain a backup type identifier (e.g. MongoDB, MySQL, NBU), and a unique backup-set ID. Files of the same backup would be tagged with this identifier. This would allow other tasks to operate on the backup, that may consist of many files in many directories, as a single unit.

DDBoost Automatic Tagging

In an embodiment, the tagging of files for a backup is performed using a defined protocol (MDTag and DDBoost) to automatically apply tags on files and directories. The metadata tags are made up of information identified by the protocol during the backup process. Examples described herein include backup server hostname or IP address, user and application performing the backup, though embodiments are not so limited. Although embodiments may be described with respect to a particular method of building on this information to identify sets of files that belong to a single backup, it should be noted that this can vary significantly from application to application both in number and in location of the files themselves. By identifying which files make up a single backup, other tasks are then able to recognize and manage the backup as a whole.

In an embodiment, there are certain steps that are performed to identify and tag all file in a backup. First, DDBoost uses information provided through the DDBoost SDK API, when instantiating the DD Boost instance, to identify what application is being used. Second, using this identifier, the application specific workflow information is used to recognize what file or directory operations indicate when a backup is complete. For example: MongoDB Ops Manager creates a manifest file in a subdirectory holding the files in the backup set. DDBoost creates two tags and associates them with this final file or possibly the directory. The file or directory tagged is dependent on the application. The tags are as follows: (1) a tag indicating the backup type, and (2) a tag indicating the unique backup identifier. Programming code for an example set of tags is provided as follows:

```
ops-mgr-ID/replS0/5a97f7/opsmgr-manifest
TAG_COPYSET_TYPE = mongodb
TAG_COPYSET_ID = 5a97f7
```

DDBoost adds this unique backup-set identifier to each of the files in the backup set. Programming code for adding identifiers is provided as follows:

```
ops-mgr-id/replS0/5a97f7/storage.bson
TAG_COPYSET_ID = 5a97f7
ops-mgr-id/replS0/5a97f7/index-0-5657842125410046783.wt
TAG_COPYSET_ID = 5a97f7
ops-mgr-id/replS0/5a97f7/WiredTiger.wt
TAG_COPYSET_ID = 5a97f7
ops-mgr-id/replS0/5a97f7/WiredTigerLAS.wt
TAG_COPYSET_ID = 5a97f7
ops-mgr-id/replS0/5a97f7/index-1-5037602346629941848.wt
TAG_COPYSET_ID = 5a97f7
ops-mgr-id/replS0/5a97f7/collection-0-5037602346629941848.wt
TAG_COPYSET_ID = 5a97f7
ops-mgr-id/replS0/5a97f7/collection-2-5037602346629941848.wt
TAG_COPYSET_ID = 5a97f7
ops-mgr-id/replS0/5a97f7/index-3-5037602346629941848.wt
TAG_COPYSET_ID = 5a97f7
ops-mgr-id/replS0/5a97f7/collection-5-5037602346629941848.wt
TAG_COPYSET_ID = 5a97f7
ops-mgr-id/replS0/5a97f7/WiredTiger.lock
TAG_COPYSET_ID = 5a97f7
ops-mgr-id/replS0/5a97f7/WiredTiger
TAG_COPYSET_ID = 5a97f7
ops-mgr-id/replS0/5a97f7/WiredTiger.turtle
TAG_COPYSET_ID = 5a97f7
ops-mgr-id/replS0/5a97f7/index-6-5037602346629941848.wt
TAG_COPYSET_ID = 5a97f7
ops-mgr-id /replS0/5a97f7/sizeStorer.wt
TAG_COPYSET_ID = 5a97f7
ops-mgr-id /replS0/5a97f7/_mdb_catalog.wt
TAG_COPYSET_ID = 5a97f7
```

With respect to discovering a backup, the MDTAG Search by Tag feature, along with the placement of these tags, enable management tasks to quickly discover what backups are stored. This information can be used to generate a catalog, or to archive, expire, or retrieve a complete backup. Following are example pseudo-code segments that illustrate steps required using files tagged in the example above using MongoDB Ops Manager.

```
- File/object tag store can be searched for all MongoDB backups
  TAG_COPYSET_TYPE EQUAL == mongodb
  Result: ops-mgr-id/replS0/5a97f7/opsmgr-manifest
- TAG_COPYSET_ID can be retrieved for this backup manifest file:
  Result: TAG_OPYSET_ID = 5a97f7
. File/object tag store can be searched for all files with the same
    unique TAG_COPYSET_ID == 5a97f7
  Result:
    ops-mgr-id/replS0/5a97f7/storage.bson
    ops-mgr-id/replS0/5a97f7/index-0-5657842125410046783.wt
    ops-mgr-id/replS0/5a97f7/WiredTiger.wt
    ops-mgr-id/replS0/5a97f7/WiredTigerLAS.wt
    ops-mgr-id/replS0/5a97f7/index-1-5037602346629941848.wt
    ops-mgr-id/replS0/5a97f7/collection-0-5037602346629941848.wt
    ops-mgr-id/replS0/5a97f7/collection-2-5037602346629941848.wt
    ops-mgr-id/replS0/5a97f7/index-3-5037602346629941848.wt
```

```
ops-mgr-id/replS0/5a97f7/collection-5-5037602346629941848.wt
ops-mgr-id/replS0/5a97f7/WiredTiger.lock
ops-mgr-id/replS0/5a97f7/WiredTiger
ops-mgr-id/replS0/5a97f7/WiredTiger.turtle
ops-mgr-id/replS0/5a97f7/index-6-5037602346629941848.wt
ops-mgr-id /replS0/5a97f7/sizeStorer.wt
ops-mgr-id /replS0/5a97f7/_mdb_catalog.wt
```

The date and time this backup was generated can be discovered using the MDTAG System (virtual) tags on these files.

The illustrative code segments provided above are intended to be for example only, and many different programming variations are possible. For example, the metadata tags in the example are meant to highlight values that can be used to identify a backup set. Other default tags would provide the ability to query where these files originated, who originated them, or the process used.

Extended Metadata

In an embodiment, the process 116 uses DD-BoostFS client software (which provides a generic network mount for DD systems) and DD-Boost-SDK plugins to automatically create extended metadata for each DDR filesystem object that is created through DD-Boost. The extended metadata is derived from Boost environmental information that is directly or indirectly available to DD-Boost, including the application name, client, client IP address, and so on. This mechanism provides a consistent core metadata across all use-cases and provides a method that makes use of the client deployment/runtime environment to consistently detect and set extended metadata on storage appliance objects.

In general, Data Domain (DD) systems are based on a Stream Informed Segment Layout (SISL) scaling architecture that means that Data Domain systems are CPU-centric not spindle-bound for performance like other deduplication platforms. Data Domain Boost is generally a software option that is available for all Data Domain systems. DD Boost is made up of two components: a DD Boost plug-in that runs on the backup server or client and a DD Boost component that runs on the Data Domain system. All connectivity between components uses industry standard Ethernet or Fibre Channel. DD Boost software enables tight integration with backup and enterprise applications using an optimized transport. DD Boost includes three main features. The first is distributed segment processing, which distributes parts of the deduplication process from the Data Domain system to the backup server or client, increasing backup application performance. The second is managed file replication, which allows backup applications to manage Data Domain replication with full catalog awareness. The third is advanced load balancing and link failover, which provides link aggregation for load balancing and link failover, which eliminates the need for network layer aggregation. With DD Boost and managed file replication, backup administrators can control the backup, restore, and replication of the backup images written to Data Domain systems from the backup application console in a catalog-aware manner.

Figure 2:
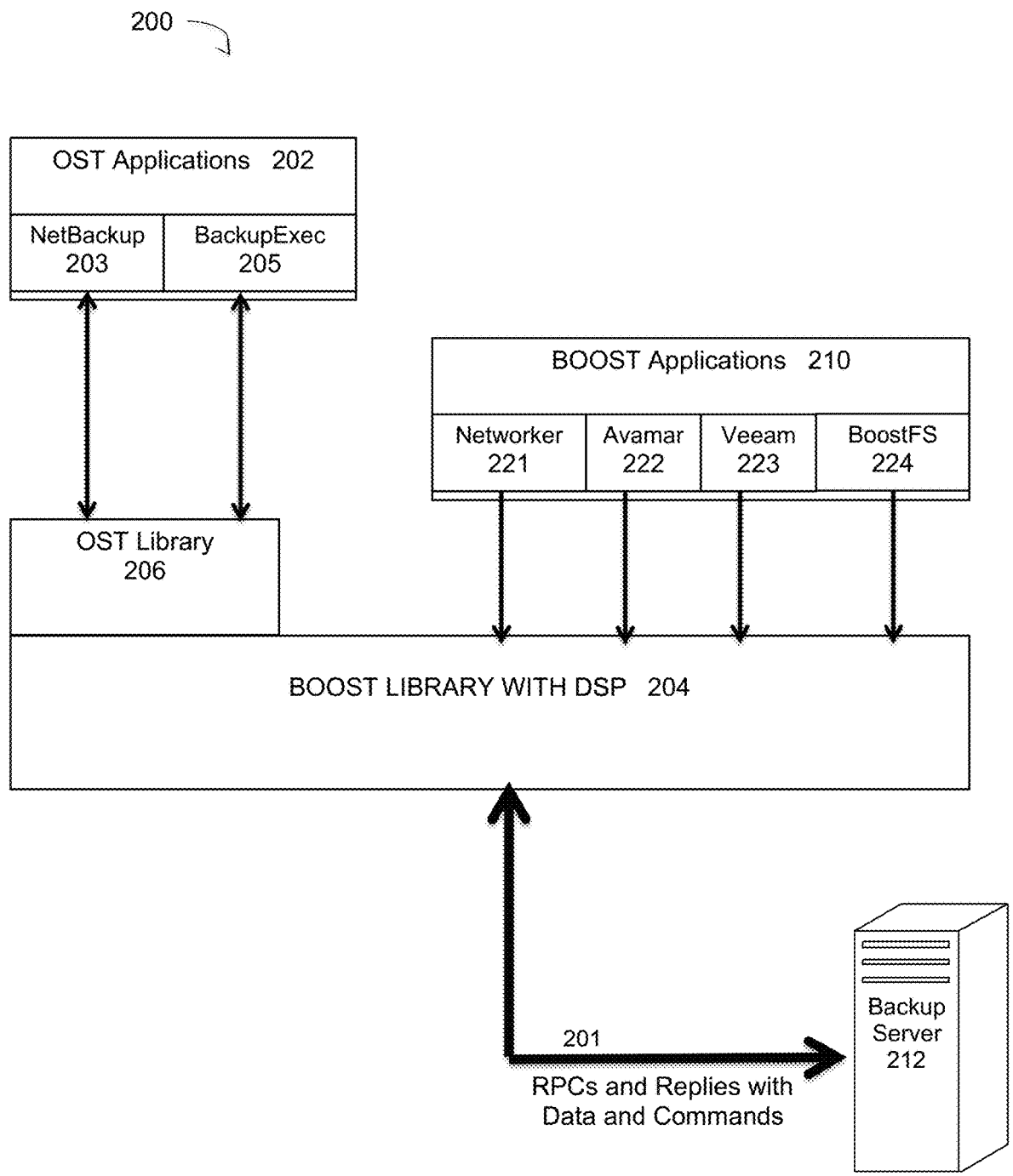
FIG. 2 illustrates a logical view of a DD Boost software stack and the DD Boost library in relation to an application and backup server, under some embodiments.

DD Boost offloads processing to a backup server by extending its software library to the backup server. FIG. 2 illustrates a logical view of a DD Boost software stack and the DD Boost library in relation to an application and backup server, under some embodiments. As shown in FIG. 2, various different applications communicate with the Boost library 204 to access the backup server 212 through a data exchange 201 that comprises remote procedure calls (RPC) and replies with data and commands. Any number of different applications and application types may interface through appropriate libraries or interfaces. For the example of FIG. 2, Boost applications 210, such as Networker 221, Avamar 222, Veeam 223 and BoostFS 224 communicate directly with the libDDBoost library through direct Data Domain communication protocols. Other Boost applications, such as RecoverPoint, and so on may also be included within the Boost Applications 210. Non-Boost applications that may communicate with the Boost library 204 through appropriate libraries include popular OST applications. Thus, for the example of FIG. 2, OpenStorage Technology (OST) applications 202 including NetBackup 203 and BackupExec 205 (both by Symantec) communicate with the Boost library 204 through OST library 206. FIG. 2 illustrates just one or two types of applications that integrate with the Boost software stack, and embodiments are not so limited. Any other appropriate application or set of applications may also be used, such as the Oracle Media Management Layer (MML) API, which allows third party storage providers to create software to interoperate with Oracle's Recovery Manager (RMAN), and others.

In an embodiment, process 116 uses file system operations that are directed through BoostFS to the DD Boost library (libDDBoost). In general, the DD Boost file system plug-in (BoostFS) is a standard filesystem interface that installed on the Linux operating system of an application server. On the client, the filesystem operations conducted on the BoostFS mount point use the Boost protocol to transfer data to and from the backup (Data Domain) system. As a result, files and directories created on the mount point are actually stored in the storage-unit on the backup system. By directly accessing the mount point provided by BoostFS on the client, a third-party data protection application that does not have the specific DD Boost API integration can still realize system benefits. On the client, users/programs/scripts can access the mount point in the same way that a local directory is accessed.

Figure 3:
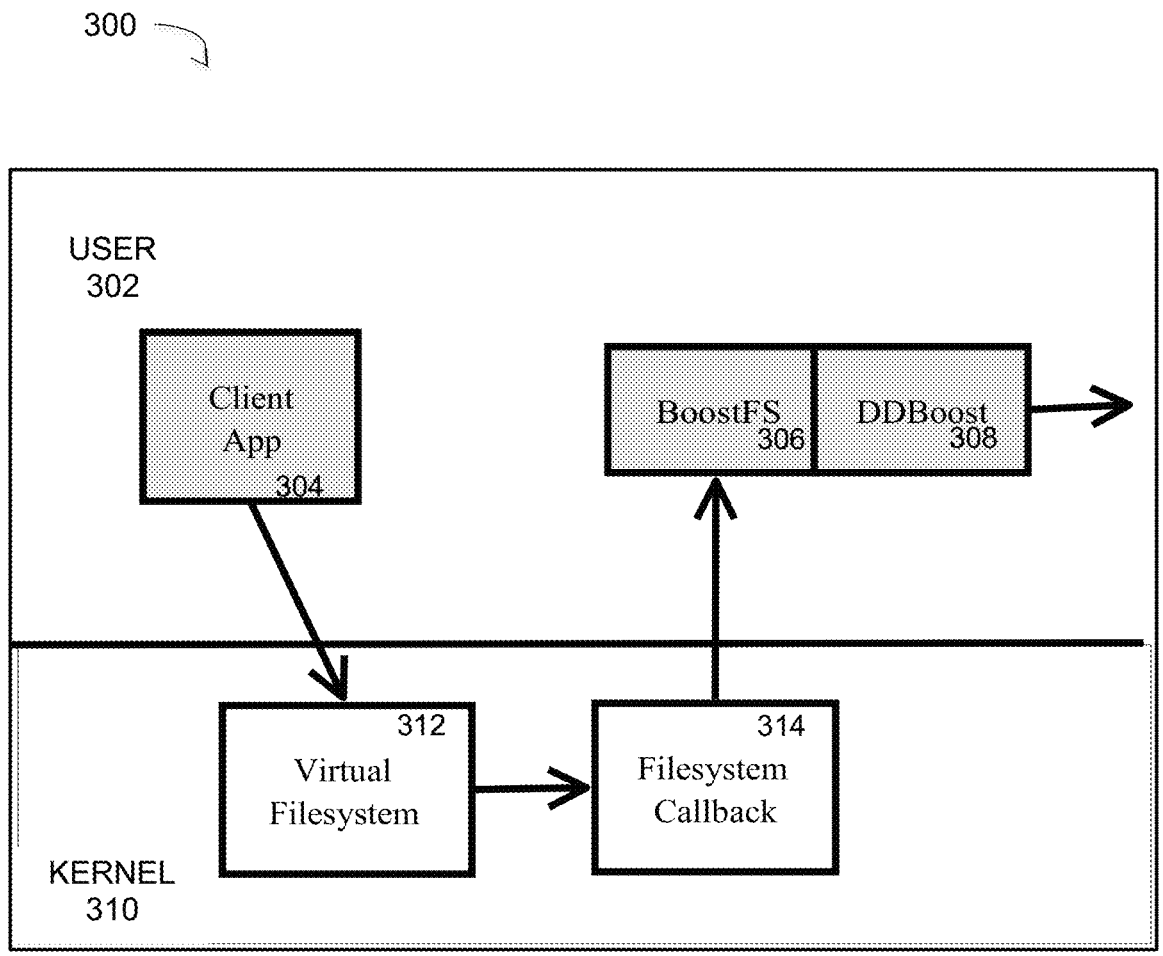
FIG. 3 illustrates the components of a client system using BoostFS under some embodiments.

FIG. 3 illustrates the components of a client system using BoostFS under some embodiments. In diagram 300 of FIG. 3, a client application 304 running in user-space 302 on a client computer system accesses a mounted filesystem (e.g., performing create, read, write file operations), which is a BoostFS user-space filesystem. The application makes operating system calls to the client kernel 310 virtual filesystem module 312 which passes the operations through the kernel filesystem callback module 314 to the appropriate handler or driver. In this case, this is the BoostFS process in user space 306. The BoostFS process includes the DDBoost API library 308 which communicates with the DDR server (not shown). Diagram 300 illustrates a method in which standard file system requests are routed through BoostFS and eventually processed through the DD Boost library 308. FIG. 3 illustrates components in a generalized client configuration. For a specific embodiment, such as a Linux client, certain additional components may be used, such as a FUSE (Filesystem in User Space) component in the kernel 310, and other associated components.

Figure 4A:
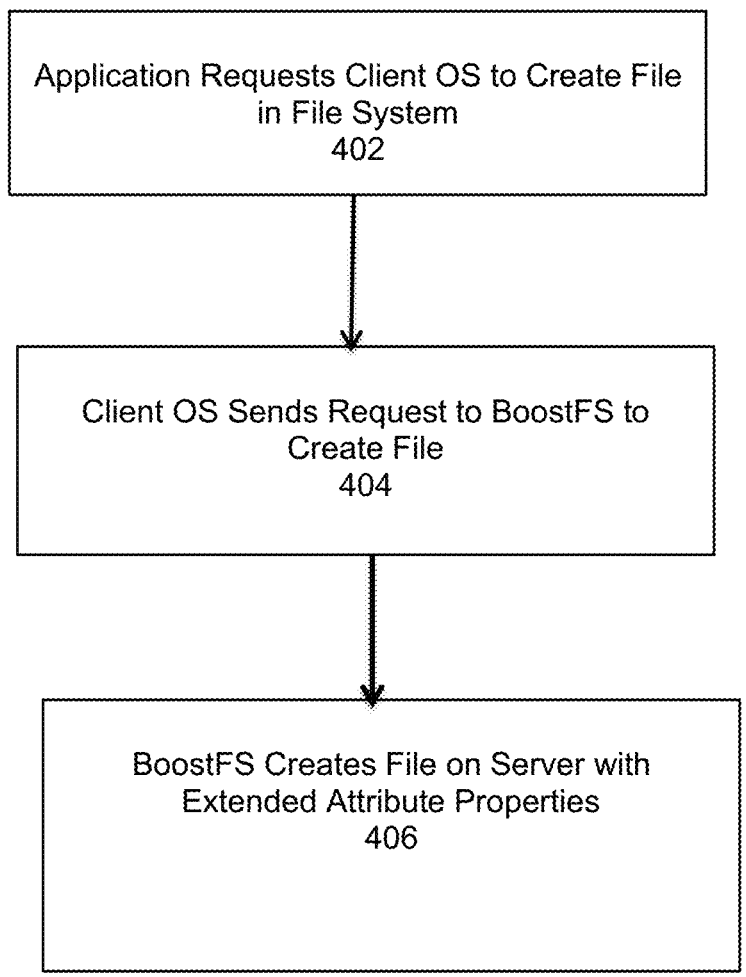
FIG. 4A illustrates a method of creating a file with automatic extended metadata under an embodiment.

FIGS. 4A-4E illustrate an overall process for creating a new file or directory with automatic extended metadata using BoostFS under some embodiments. FIG. 4A illustrates a method of creating a file with automatic extended metadata under an embodiment. In FIG. 4A, a client application requests the operating system to create a file 402. The operating system passes this to BoostFS 404, which then creates the file along with automatic extended metadata on the DDR server 406.

Figure 4B:
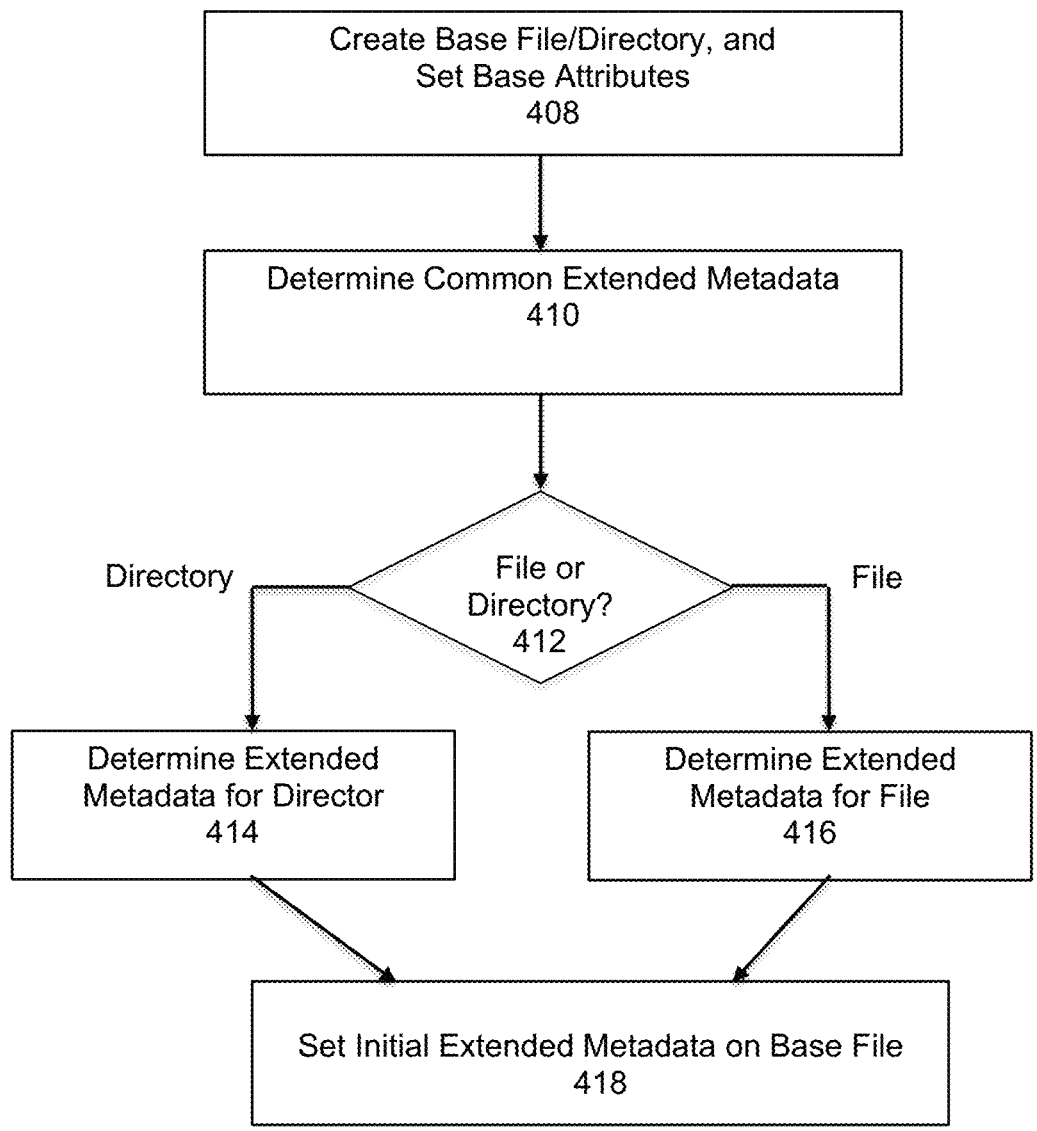
FIG. 4B illustrates certain process steps for creating a BoostFS file with automatic extended attributes, as shown in process block 406 of FIG. 4A, under an embodiment.

FIG. 4B illustrates certain process steps for creating a BoostFS file with automatic extended attributes, as shown in process block 406 of FIG. 4A. As shown in FIG. 4B, in creating a file with automatic extended metadata, the file is first created on the server with base attributes 408. Base attributes include the file owner and access mode. Next, the common extended metadata is determined and placed into a new tagset 410. A check is made whether or not the object being created is a file or a directory, as shown in decision block 412. If the object is a file, as determined in block 412, file-specific extended metadata is added to the tagset 416. If the object is a directory, as determined in block 412, directory-specific extended metadata is added to the tagset 414. Finally, the tagset is saved to the server as the automatic extended metadata for the new file or directory 418.

Figure 4C:
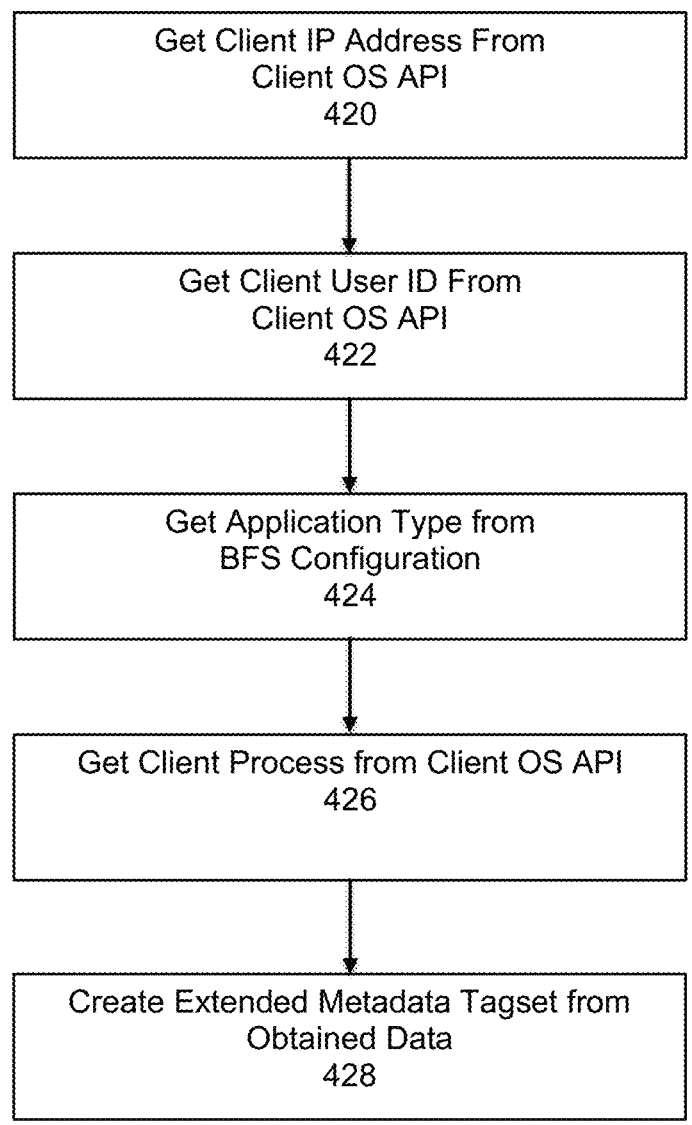
FIG. 4C illustrates certain process steps for creating common extended metadata for a new file or directory as shown in process block 410 of FIG. 4B, under an embodiment.

FIG. 4C illustrates certain process steps for creating common extended metadata for a new file or directory as shown in process block 410 of FIG. 4B, under an embodiment. As shown in FIG. 4C, information is gathered from the operating system, including client IP address/hostname 420, client user ID 422, and client process 426. Other information, including the type of application client 424 is determined from the BoostFS (BFS) configuration and available information. The information gathered in steps 420 to 426 is then transformed into extended metadata tags 428 and placed into a tagset used by step 410 in FIG. 4B.

Figure 4D:
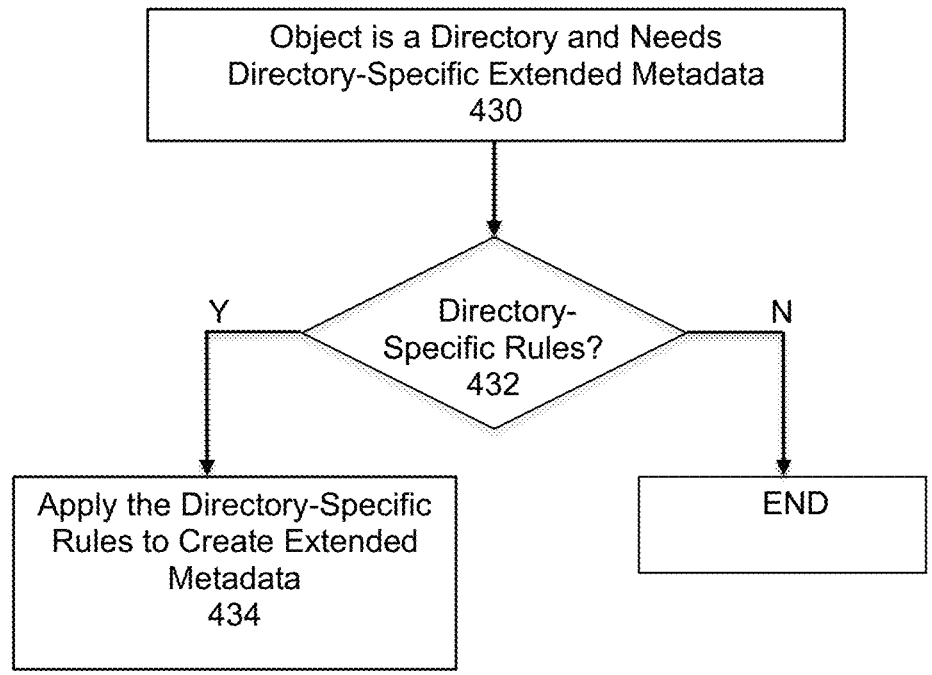
FIG. 4D illustrates process steps for creating directory-specific extended metadata for the process of FIG. 4B, under an embodiment.

As shown in FIG. 4B, the process checks whether or not the object is a file or directory (412). In an embodiment, a further check is performed to determine whether any file or directory-specific rules should be applied to the object. FIG. 4D illustrates process steps for creating directory-specific extended metadata for the process of FIG. 4B, under an embodiment. The process of FIG. 4D applies if the object is a directory and needs directory-specific extended metadata, 430. The application type is checked to determine if any directory-specific application rules should be applied to this directory, 432. If yes, extended metadata tags are created based on the rules 434, and placed into the tagset used by step 428 in FIG. 4C. If the application does not have any directory-specific rules, then the process of FIG. 4D ends.

Figure 4E:
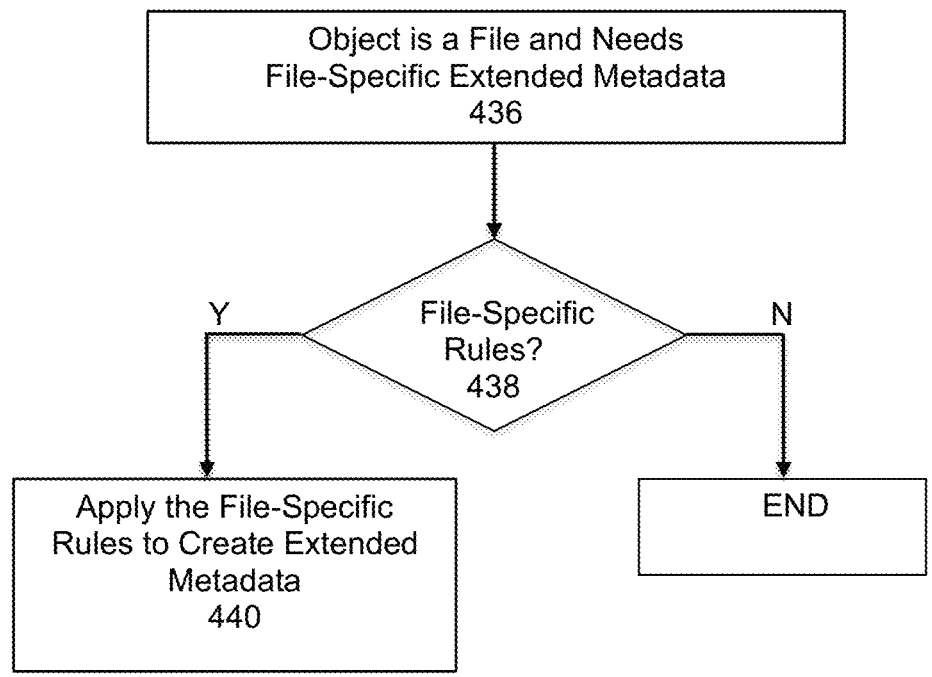
FIG. 4E illustrates process steps for creating file-specific extended metadata for the process of FIG. 4B, under an embodiment.

FIG. 4E illustrates process steps for creating file-specific extended metadata for the process of FIG. 4B, under an embodiment. The process of FIG. 4E applies if the object is a file and needs file-specific extended metadata, 436. The application type is checked to determine if any file-specific application rules should be applied to this file 438. If yes, extended metadata tags are created based on the rules 440 and placed into the tagset used by step 428 in FIG. 4C. If the application does not have any file-specific rules, then the process of FIG. 4E ends.

In an embodiment, the applications 202 and 210 of FIG. 2 are both metadata-aware and non-metadata aware. The process 116 sets the extended metadata to provide consistent core metadata across all applications and use-cases in a particular use scenario of network 100, such as an enterprise backup and recovery platform. In a general method of creating application-centric extended metadata for a storage appliance, process 116 obtains environmental information that is available to the DD Boost software. This can include information such as application name, client name, client IP address, and other similar information or items of data. Other information regarding the application may also be provided. This may include whether the file was part of a backup set, the application process that created it, possible options (e.g., full/incremental), a backup set identifier to easily identify all files of a single backup, or the type of file being created (e.g., manifest file). A sample list of corresponding tags is as follows:

```
TAG_APPLICATION_TYPE = MONGODB
TAG_FILE_TYPE = MANIFEST
TAG_BACKUP_SYSTEM = client1.acme.com
TAG_BACKUP_IDENTIFIER =   0x11223344   (unique id)
```

The process then uses the DD-BoostFS client software and DD-Boost-SDK or other appropriate plugins to automatically create extended metadata for each of the DDR filesystem objects created through DD-Boost. The DD-BoostFS client software provides a generic network mount for DD systems, and non-DD systems can use similar network mount mechanisms. The process may continuously monitor the deployment and runtime environment to detect and define changes to the environmental information, and this information is used to regularly and consistently set the extended metadata. The period of monitoring and metadata updates can be set by the system or an administrator depending on system constraints and requirements.

Figure 5:
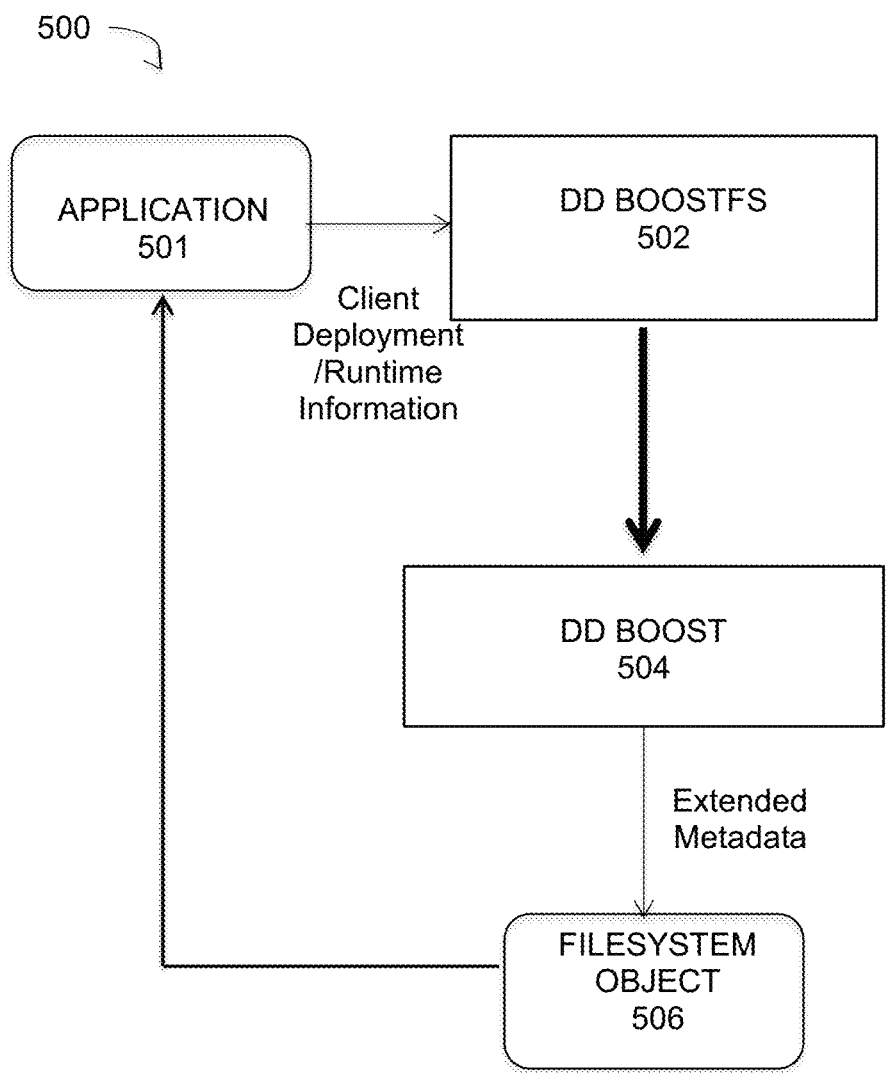
FIG. 5 illustrates a system that updates file system objects using extended metadata automatically created by a DD-BoostFS plugin under some embodiments.

FIG. 5 illustrates a system that updates file system objects using extended metadata automatically created by the DD Boost plugin under some embodiments. As shown in diagram 500, an application 501 creates file system objects through BoostFS 502. The DD BoostFS file system 502 passes these through to the DD Boost plugin 504. The DD Boost logic recognizes certain environmental and application specific information and creates extended metadata for the filesystem objects being created 506.

Embodiments describe an extended metadata creation process that is embedded in a unified client component (DD-Boost) and produces consistent extended metadata regardless of the application environment. This represents a marked improvement over present application-aware setting of extended metadata methods that requires per-application changes that may be inconsistent.

Although embodiments have been described with respect to network backup comprising certain specific technologies, such as DD Boost systems, it should be noted that embodiments are not so limited, and that other backup systems and methods may also utilize the methods described herein.

Figure 6:
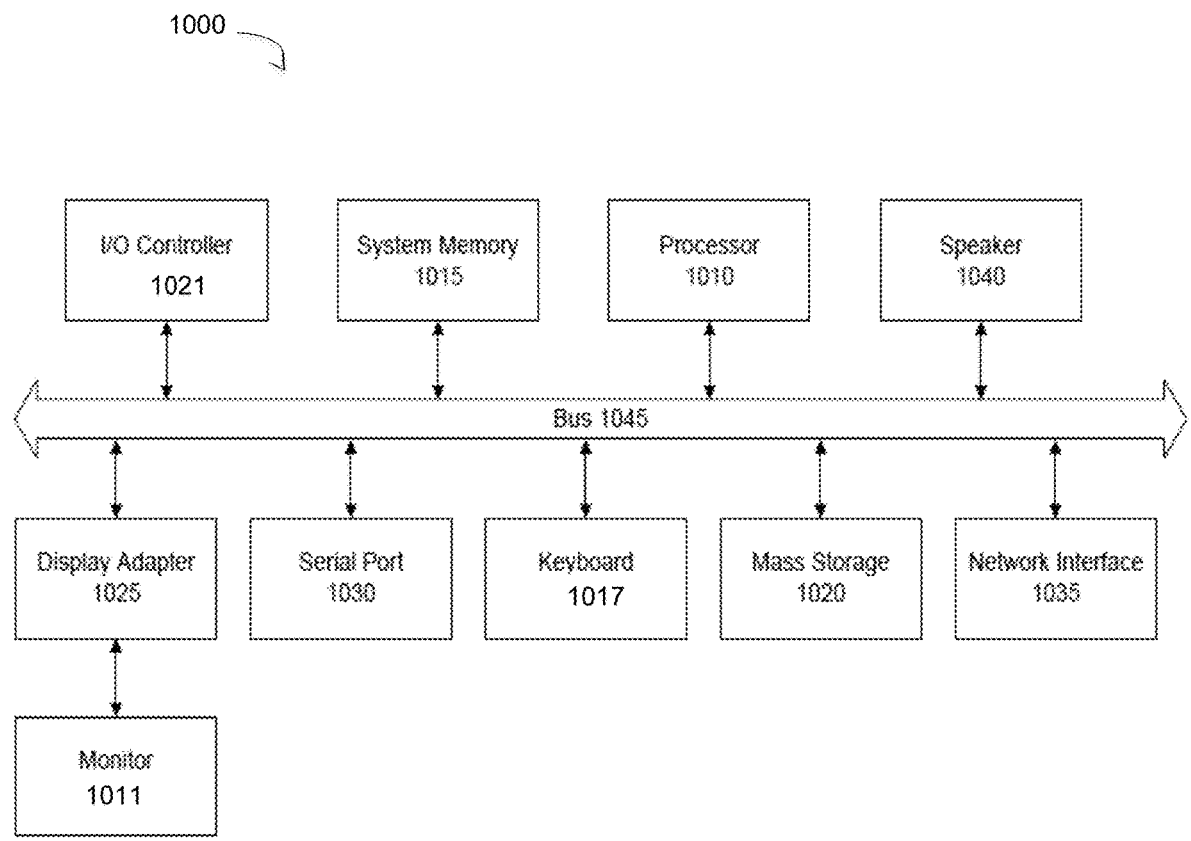
FIG. 6 is a block diagram of a computer system used to execute one or more software components of an automatic extended metadata generation process, under some embodiments.

As described above, in an embodiment, system 100 includes an extended metadata generation process 116 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 6 is a block diagram of a computer system used to execute one or more software components of the described process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing consistent metadata to storage appliance objects in a network, comprising:
    obtaining environmental information that is available to deduplication backup program accessing the storage appliance objects, the environmental information comprising application name, client name, and client IP address;
    identifying filesystem objects created by the deduplication backup program; and
    using a client-side generic network mount for the deduplication backup system to automatically create extended metadata for each of the identified filesystem objects created through the deduplication backup program.

2. The method of claim 1 further comprising continuously monitoring the deployment and runtime environment of the storage appliance objects to detect and define changes to the environmental information for regeneration or modification of the extended metadata.

3. The method of claim 2 wherein the storage appliance objects comprise file systems, files, and storage units.

4. The method of claim 2 wherein the extended metadata is used by management applications to perform analysis tasks.

5. The method of claim 1 wherein the network comprises a Data Domain Restorer (DDR)-based deduplication storage system having a storage server implemented as a DDR Deduplication Storage server for DDR storage devices.

6. The method of claim 5 wherein the deduplication backup software is distributed between deduplication storage system and a generic network-client software component providing a deduplication-aware network filesystem mount.

7. The method of claim 6 wherein an application making a non-deduplication aware backup of data backs up through the deduplication-aware network filesystem mount.

8. The method of claim 7 wherein the client deduplication-aware software uses the client application environment to determine properties of the backup being made.

9. The method of claim 8 wherein the client deduplication-aware software automatically stores with the backup of data made by the non-deduplication aware backup application extended metadata.

10. The method of claim 9 wherein the extended metadata automatically stored includes at least client IP address, application name information.

11. The method of claim 10 wherein the automatic extended metadata added by the client deduplication-aware software is used to manage backups made without requiring extended metadata awareness in the non-deduplication aware backup application.

12. The method of claim 5 wherein the deduplication backup program comprises a Data Domain (DD) Boost program, and wherein the generic network mount comprises a DD BoostFS plugin program, and wherein the application comprises one of: a Boost application accessing a backup server hosting the deduplication backup program through a Boost library, or a non-Boost application accessing a backup server hosting the deduplication backup program through a Boost library and an intermediate library.

13. A system comprising a processor-based executable module configured to provide consistent metadata to storage appliance objects in a network, comprising:
    a first component obtaining environmental information that is available to deduplication backup program accessing the storage appliance objects, the environmental information comprising application name, client name, and client IP address; and
    a second component identifying filesystem objects created by the deduplication backup program, and using a client-side generic network mount for the deduplication backup system to automatically create extended metadata for each of the identified filesystem objects created through the deduplication backup program.

14. The system of claim 13 further comprising a monitor continuously monitoring the deployment and runtime environment of the storage appliance objects to detect and define changes to the environmental information for regeneration or modification of the extended metadata, and wherein the storage appliance objects comprise file systems, files, and storage units, and further wherein the extended metadata is used by management applications to perform analysis tasks.

15. The system of claim 13 wherein the network comprises a Data Domain Restorer (DDR)-based deduplication storage system having a storage server implemented as a DDR Deduplication Storage server for DDR storage devices.

16. The system of claim 15 wherein the deduplication backup software is distributed between deduplication storage system and a generic network-client software component providing a deduplication-aware network filesystem mount, and wherein an application making a non-deduplication aware backup of data backs up through the deduplication-aware network filesystem mount.

17. The system of claim 16 wherein the client deduplication-aware software uses the client application environment to determine properties of the backup being made, and wherein the client deduplication-aware software automatically stores with the backup of data made by the non-deduplication aware backup application extended metadata.

18. The system of claim 13 wherein the extended metadata automatically stored includes at least client IP address, application name information.

19. The system of claim 18 wherein the automatic extended metadata added by the client deduplication-aware software is used to manage backups made without requiring extended metadata awareness in the non-deduplication aware backup application.

20. A computer program product, comprising a non-transitory computer-readable medium having a computer-readable program code embodied therein, the computer-readable program code executed by one or more processors to implement a method for providing consistent metadata to storage appliance objects in a network, by:
    obtaining environmental information that is available to deduplication backup program accessing the storage appliance objects, the environmental information comprising application name, client name, and client IP address;
    identifying filesystem objects created by the deduplication backup program; and
    using a client-side generic network mount for the deduplication backup system to automatically create extended metadata for each of the identified filesystem objects created through the deduplication backup program.

* * * * *